(12) United States Patent
Awano et al.

(10) Patent No.: US 7,434,241 B2
(45) Date of Patent: Oct. 7, 2008

(54) RECORDING AND REPRODUCING APPARATUS OF THIN OPTICAL DISC

(75) Inventors: Hiroyuki Awano, Noda (JP); Norio Ota, Yawara (JP); Osamu Ishizaki, Chikusei (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 394 days.

(21) Appl. No.: 11/269,842

(22) Filed: Nov. 9, 2005

(65) Prior Publication Data
US 2006/0101482 A1    May 11, 2006

(30) Foreign Application Priority Data
Nov. 10, 2004  (JP) ............................. 2004-326850
Aug. 10, 2005  (JP) ............................. 2005-231455

(51) Int. Cl.
*G11B 17/028*  (2006.01)
(52) U.S. Cl. ..................................................... 720/715

(58) Field of Classification Search ................. 720/715, 720/695, 696, 697
See application file for complete search history.

(56) References Cited

U.S. PATENT DOCUMENTS
4,841,516 A * 6/1989 Ohmori et al. .............. 369/264
6,871,352 B2 * 3/2005 Kurosaka et al. ............ 720/707

FOREIGN PATENT DOCUMENTS
JP    51-69930       6/1976
JP    07-003690 B2   1/1995
JP    10-308059 A    11/1998

* cited by examiner

*Primary Examiner*—Allen T Cao
(74) *Attorney, Agent, or Firm*—Birch, Stewart, Kolasch & Birch, LLP

(57) ABSTRACT

In an apparatus for recording and reproducing a thin optical disc by using the same optical system as that of a CD, a DVD or the like, the invention provides a technique which can stably rotate the thin optical disc at a high speed. The structure can be made such that a turbulence of an airflow is not generated even if the thin optical disc on a turn table is rotated at a high speed, by employing a transparent turn table and arranging a recording and reproducing head or the like in an opposite side to a thin optical disc mounting surface of the turn table.

6 Claims, 5 Drawing Sheets

_US 7,434,241 B2_

RECORDING AND REPRODUCING APPARATUS OF THIN OPTICAL DISC

TECHNICAL FIELD

The invention relates to a recording and reproducing apparatus of a thin optical disc, and more particularly to a recording and reproducing apparatus executing a recording and a reproduction of a thin optical disc by using the same optical system as that of a compact disc (CD), a digital versatile disc (DVD) or the like.

BACKGROUND ART

In connection with an advance of an information society and an exchange of an enormous amount of information, a recording apparatus for recording a high capacity information becomes common, and a recording density of a recording medium is significantly improved. In general, in the optical recording apparatus of the CD, the DVD or the like, a physical limitation of the recording density is determined on the basis of a used laser wave length and a numerical aperture of an objective lens. Accordingly, an improvement of the recording density is intended by making the laser wave length shorter and making the numerical aperture of the objective lens larger. However, since a technical standard of the optical system of the recording and reproducing apparatus, the recording medium or the like is changed to a new one each time when the recording density is improved in accordance with this method, a great cost is required for developing the recording medium having the improved recording density and the recording and reproducing apparatus thereof so as to manufacture and sell.

On the other hand, it is considered to intend an increase of the recording capacity by using a technique such as a red DVD which has been already marketed and has been inexpensive. For example, in patent document 1, there is proposed a method utilizing a thin substrate which has an improved mechanical property, is inexpensive and can be easily manufactured. In an embodiment in the patent document 1 (JP-B2-7-3690), there is described a structure in which an optical disc is manufactured by pinching a disc having a recording film formed on a substrate made of a polyether sulfone resin and having a thickness of 100 μm between two acrylic discs having a thickness of 1.5 mm and a diameter of 200 mm at a high pressure, and the optical disc is mounted on a turn table and is optically read and written.

However, in the technique described in the patent document 1, since the optical disc having the diameter of 200 mm is utilized as the recording medium, there are problems that the apparatus becomes large in size and complicated in comparison with the existing DVD recording and reproducing apparatus or the like, and a manufacturing cost is increased. Further, in order to achieve a higher capacity, it is necessary to further enlarge the size of the optical disc.

Accordingly, there has been proposed to use a thin optical disc having a thickness of about 100 μm in which a recording film is pinched by thin transparent sheets in place of an acrylic material, the thin optical disc corresponding to a recording medium having a diameter of about 120 mm in the same manner as the existing CD, DVD or the like. If a cartridge type recording medium is structured by receiving a plurality of thin optical discs mentioned above, it is possible to increase a recording capacity without making the recording and reproducing apparatus large in size and complicated.

Patent document 2 (JP-A-10-308059) describes a recording and reproducing mechanism holding and rotating the thin optical disc as mentioned above on a turn table. In this recording and reproducing mechanism, the recording and reproduction can be executed by using the same optical system as that of the existing CD, DVD or the like, on the basis of a provision of an optical correction means having an equal optical path length to the acrylic substrate used in the conventional DVD recording medium or the like, between the optical system and the thin optical disc.

DISCLOSURE OF THE INVENTION

Problem to be Solved by the Invention

In the recording and reproducing apparatus of CD, DVD or the like, in order to improve a recording and reproducing speed, it is general to rotate the recording medium at a high speed of some thousands rpm. However, in the recording and reproducing mechanism described in the patent document 2, when rotating the turn table and the thin optical disc at a high speed, a turbulence of an airflow is generated under the influence of a recording and reproducing head or the like existing just above them, so that the thin optical disc having a flexibility can not stably rotate. If the thin optical disc is not stable at a time of rotating, there is generated a problem that a recording and reproducing error is frequently generated or the like.

The present invention is made by taking the actual condition mentioned above into consideration, and an object of the present invention is to provide a technique which can stably rotate a thin optical disc at a high speed, in an apparatus for recording and reproducing the thin optical disc by using the same optical system as that of the CD, DVD or the like.

Means for Solving the Problem

As a result of a devoted research while taking the problem mentioned above into consideration, the inventor of the present invention has found that a structure that the turbulence of the airflow is not generated even if the thin optical disc on the turn table rotates at a high speed can be obtained, by using a transparent turn table, and arranging the recording and reproducing head or the like in an opposite side to the thin optical disc mounting surface of the turn table, in the apparatus for recording and reproducing the thin optical disc by using the same optical system as that of the CD, DVD or the like.

In other words, in accordance with the present invention, there is provided a recording and reproducing apparatus comprising:

a transparent turn table holding a thin optical disc; and an optical system including a recording and reproducing head for recording and reproducing the thin optical disc, wherein the optical system is arranged in an opposite side of the transparent turn table to a surface in which the thin optical disc is arranged, and a recording and reproducing light output by the optical system transmits through the transparent turn table and is focused on a recording surface of the thin optical disc.

In the recording and reproducing apparatus in accordance with the present invention, the optical system is constituted by a CD optical system or a DVD optical system including HD-DVD. Further, a thickness of the transparent turn table and a protective film of the thin optical disc is adjusted in such a manner that an optical path length transmitting through the transparent turn table and the protective film of the thin optical disc becomes approximately equal to an optical path length of a substrate of a DVD disc in the DVD optical system including HD-DVD. As mentioned above, it is possible to use the existing DVD optical system as it is, by adjusting the thickness of the transparent turn table and the thin optical disc. Further, the same matter is applied to the case of using the CD optical system.

In the recording and reproducing apparatus in accordance with the present invention, a spacer is arranged between the transparent turn table and the thin optical disc. An air layer can be secured between the turn table and the thin optical disc, on the basis of the spacer.

In the recording and reproducing apparatus in accordance with the present invention, there is further provided with a magnetic or mechanical means for fixing the thin optical disc on the transparent turn table. For example, the thin optical disc can be held on the transparent turn table by using an easily detachable magnet chuck or the like.

Effect of the Invention

As described above, in accordance with the recording and reproducing apparatus of the thin optical disc on the basis of the present invention, since the recording and reproducing head or the like is arranged in the opposite side to the thin optical disc mounting surface of the transparent turn table, the turbulence of the airflow generated by the existence of the recording and reproducing head or the like at a time of rotating the thin optical disc does not have an effect on the thin optical disc, but a stable recording and reproduction can be achieved. Further, since the transparent turn table serves as an optical correcting means having an equal optical path length to that of the acrylic substrate which has been conventionally used in the DVD recording medium or the like, it is possible to execute the recording and reproduction by using the same optical system as that of the existing CD, DVD or the like.

BRIEF DESCRIPTION OF THE DRAWINGS

FIGS. 4A and 4B are views in detail showing an installation mechanism of a magnet chuck of the recording and reproducing apparatus shown in FIG. 3, in which FIG. 4A is a bottom elevational view of the magnet chuck, and FIG. 4B is a side elevational view of the magnet chuck, a spindle motor, a turn table and the thin optical disc;

FIGS. 5A and 5B are views in detail showing a structure of a spacer of the recording and reproducing apparatus shown in FIG. 3 in which FIG. 5A shows a case that one spacer is used, and FIG. 5B shows a case that at least one additional spacer is used.

BEST MODE FOR CARRYING OUT THE INVENTION

Figure 1:
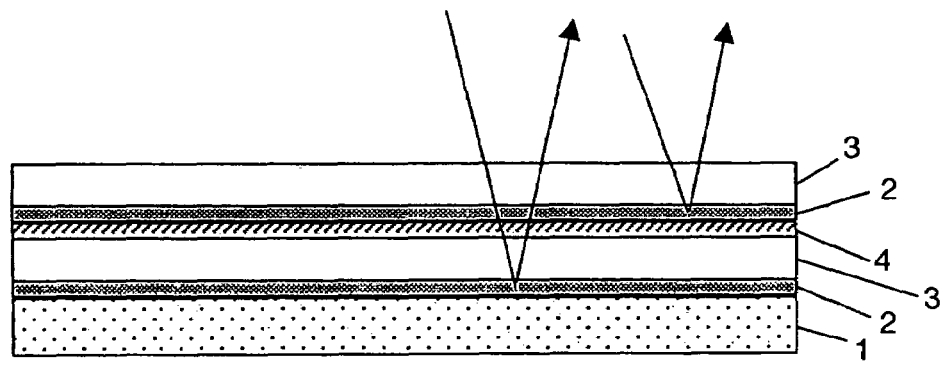
FIG. 1 is a view schematically showing a structure of a thin optical disc of one surface two layer recording type, which is used as a recording medium in a recording and reproducing apparatus in accordance with the present invention.

A description will be in detail given below of a best mode for carrying out a recording and reproducing apparatus of a thin optical disc in accordance with the present invention with reference to the accompanying drawings. FIGS. 1 to 6 are views exemplifying an embodiment in accordance with the present invention. In these drawings, the same reference numerals denote the same elements, and basic structures and operations thereof are the same.

Structure of Thin Optical Disc

FIG. 1 is a view schematically showing a structure of a thin optical disc used as a recording medium in a recording and reproducing apparatus in accordance with the present invention. FIG. 1 shows a layer structure of a thin optical disc of one surface two layer recording type. The thin optical disc is manufactured by forming a groove and an address pattern together with an eccentric correction marker on a protection coat 1 of 15 micron in accordance with a hot emboss process or the like, and gluing two layers of recording films 2 together by an adhesive agent 4. A thickness of the disc is about 50 micron. In this case, reference numeral 3 denotes a transparent sheet of 15 micron for holding the recording film 2. At present, in a research of a write once type recording medium employing a pigment, and a rewritable type recording medium employing a phase change recording film, it is said that the recording can be executed up to four layers. Accordingly, it is possible to apply the methods to the recording and reproducing apparatus and the thin optical disc in accordance with the present invention. A thickness of the thin optical disc used in the recording and reproducing apparatus in accordance with the present invention is preferably set to be equal to or less than 200 micron in order to prevent a side run-out from being generated by a centrifugal force of a disc rotation.

Figure 2:
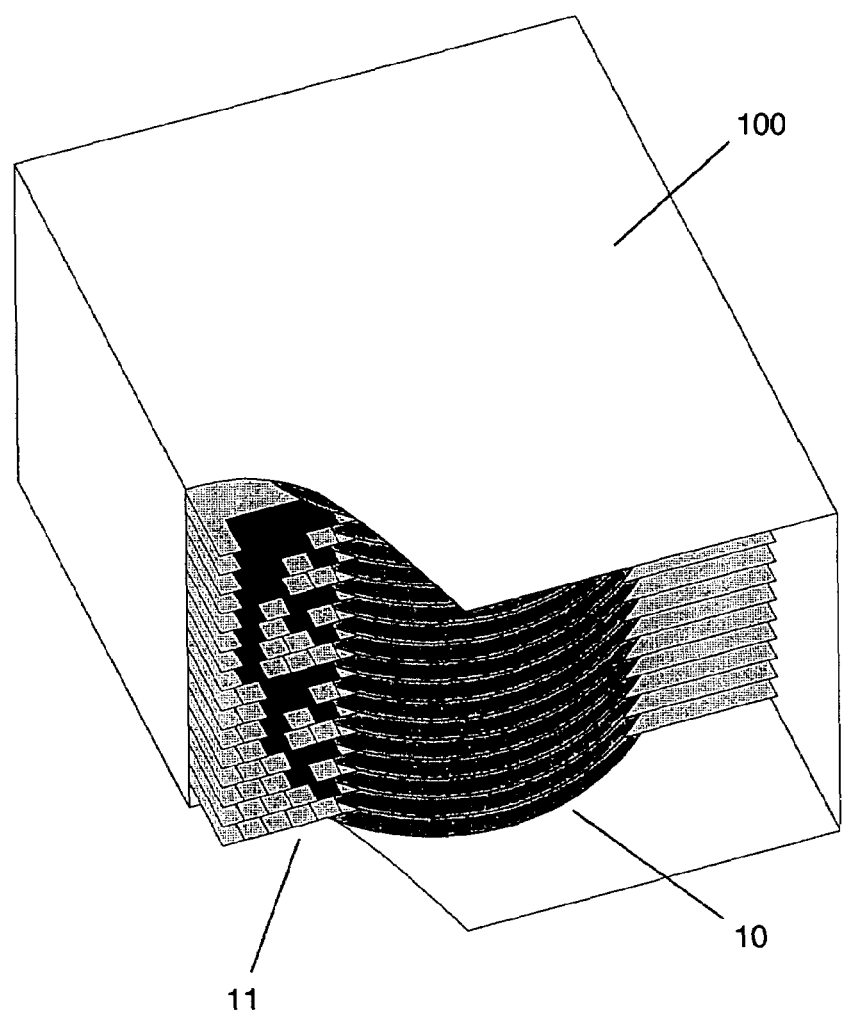
FIG. 2 is a view schematically showing a cartridge in which a plurality of thin optical discs shown in FIG. 1 are received.

FIG. 2 is a view schematically showing a cartridge 100 in which a plurality of thin optical discs 10 shown in FIG. 1 are received. The recording and reproducing apparatus in accordance with the present invention can utilize the cartridge 100 as the recording medium, and is structured such that a disc carrier apparatus (not shown) takes out the disc to be recorded and reproduced from the cartridge 100 so as to carry to a predetermined position at a time of recording or reproducing. For example, if about two hundreds of thin optical disc having a recording capacity of 4.7 GB are received in the cartridge having a thickness of 30 mm, a recording capacity of about 940 GB is achieved in an entire of the cartridge 100. Reference numeral 11 denotes a disc identification element.

Structure of Recording and Reproducing Apparatus

Figure 3:
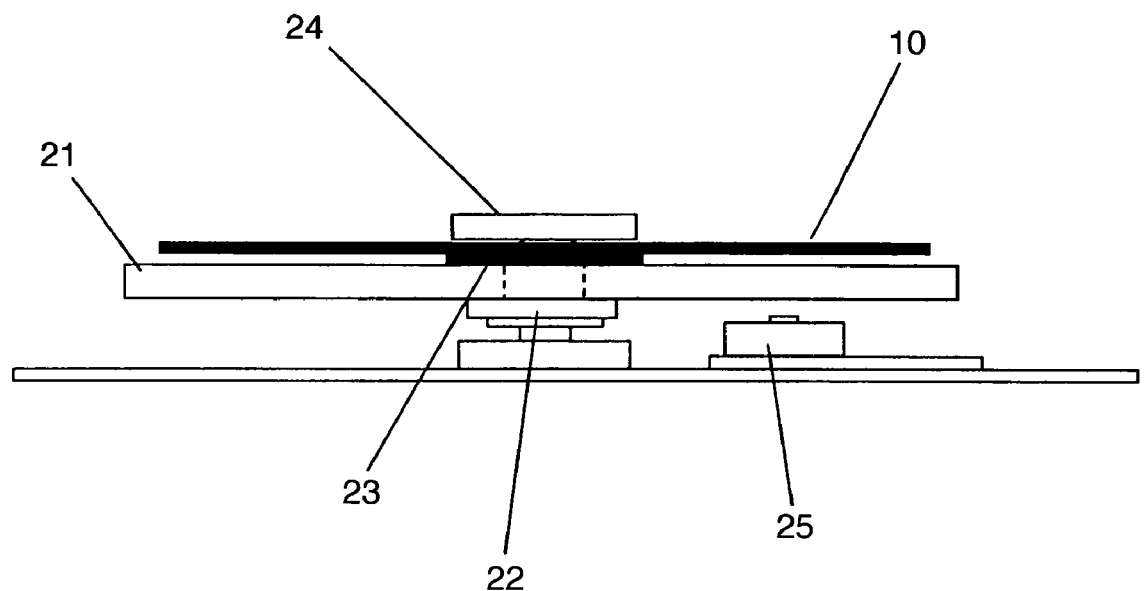
FIG. 3 is a view schematically showing a disc reading mechanism used in the recording and reproducing apparatus in accordance with the present invention.

A description will be given below of a recording and reproducing apparatus for executing a recording and a reproduction with respect to the thin optical disc shown in FIG. 1 or the thin optical disc received in the cartridge shown in FIG. 2. FIG. 3 is a view schematically showing a disc reading mechanism of the recording and reproducing apparatus in accordance with the present embodiment. The disc reading mechanism of the recording and reproducing apparatus in accordance with the present embodiment is constituted by a transparent turn table 21 mounting the thin optical disc 10, a spindle motor 22 rotating the turn table 21, a spacer 23 formed around a center on the turn table 21, a magnet chuck 24 fixing the thin optical disc 10 on the turn table 21, and a recording and reproducing head 25 using the same optical system as that of the DVD.

The spacer 23 is arranged in an upper surface of the turn table 21, and the thin optical disc 10 is structured such as to be held between the spacer 23 and the magnet chuck 24 by setting a lower surface to a recording surface. Further, the recording and reproducing head 25 is arranged below the turn table 21.

The turn table 21 is constituted by a transparent substrate having a thickness of about 0.6 mm and formed by a transparent material such as a glass or the like (a plastic in which a surface is hard coated may be employed), and a laser light passes through the transparent substrate at a time of recording and reproducing the thin optical disc 10. The transparent substrate is structured such as to execute an optical correction for the purpose of processing the thin optical disc 10 having a different structure from the recording medium of the DVD by the same optical system as that of the DVD. In other words, taking into consideration the matter that the transparent substrate layer (made of a polycarbonate or the like) of about 0.6 mm is formed on the recording layer in the recording medium of the existing DVD, the turn table 21 adjusts its thickness so as to give a corresponding optical path length. Accordingly, in the recording and reproducing apparatus in accordance with the present embodiment, it is possible to execute the recording and the reproduction with respect to the thin optical disc 10. It is assumed that a diameter of the turn table 21 is structured such as to become 2 mm or more larger (preferably 5 mm or more larger) than the diameter of the thin optical disc 10.

In this case, since the thin protection film 1 is actually formed on the surface of the thin optical disc 10 as shown in FIG. 1, it is preferable to adjust the optical path length taking the thickness thereof into consideration. Further, in order to prevent a reflection factor fluctuation caused by a multiple reflection of an incident light to the thin optical disc and secure a signal resistance property against an attachment of foreign particle or the like on the thin optical disc surface, it is preferable to set the thickness of the thin protection film of the thin optical disc to be equal to or more than 0.01 mm.

Figure 4A:
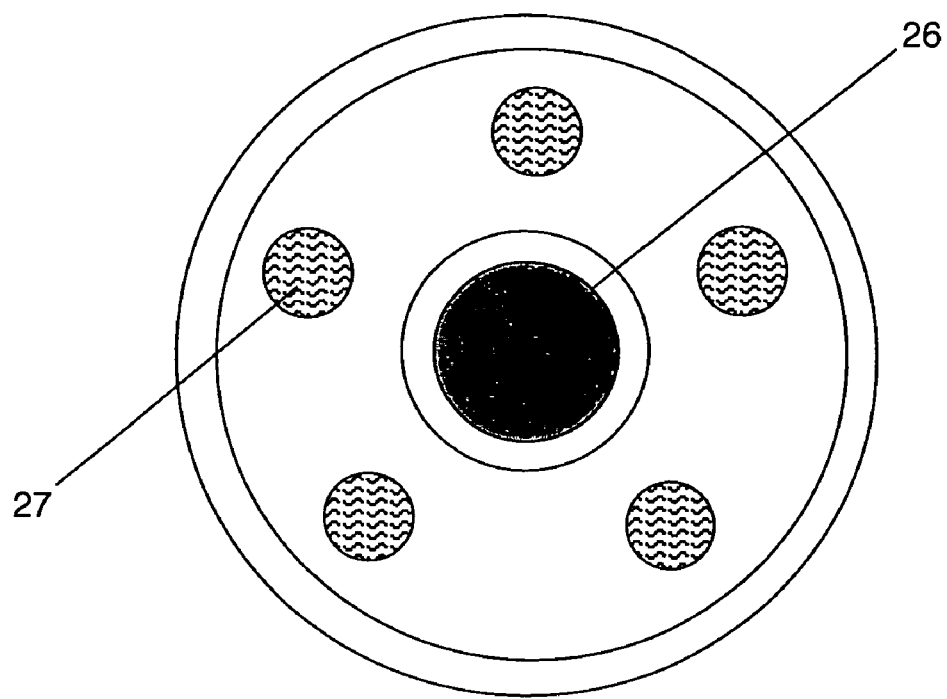
Figure 4B:
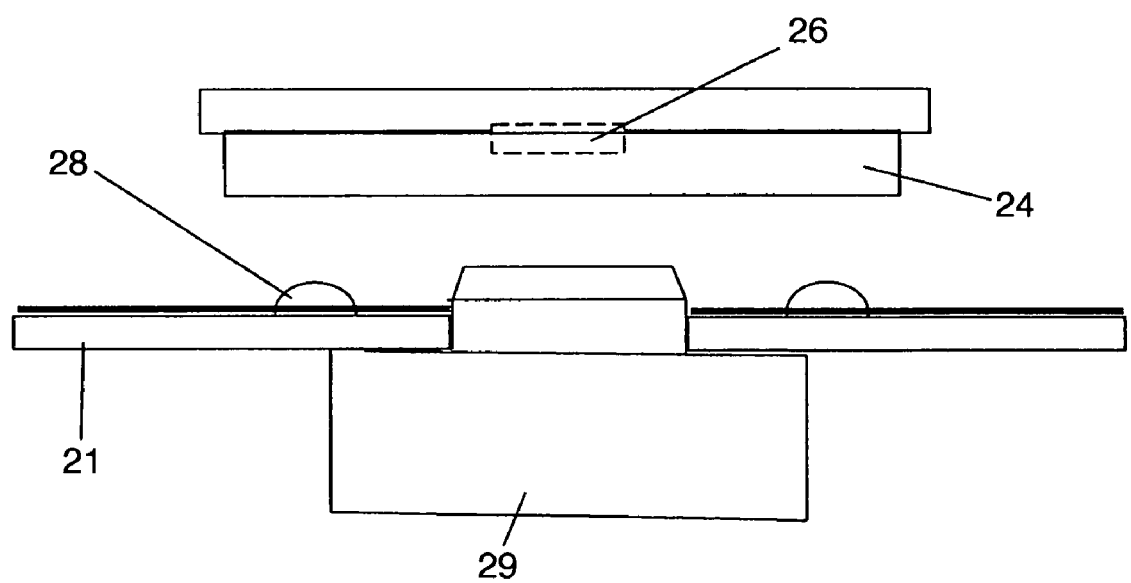

FIGS. 4A and 4B are views in detail showing an installation mechanism of the magnet chuck 24 of the recording and reproducing apparatus shown in FIG. 3. As shown in FIG. 4A corresponding to a bottom elevational view of a magnet chuck 24, the magnet chuck 24 is provided with a magnet 26 in a center portion of a bottom surface thereof, and is provided with a plurality of concave portions 27 in the periphery thereof. The magnet 26 is fitted to a spindle portion 29, and the concave portion 27 is fitted to a convex portion 28 formed on the turn table 21, thereby fixing the thin optical disc 10 on the turn table 21. A hole corresponding to the convex portion on the turn table 21 is formed in the thin optical disc 10. As mentioned above, since the structure is made such that the concave portion 27 is provided not only in the center portion of the magnet chuck 24 but also in the periphery thereof so as to be fitted to the convex portion 28 on the turn table 21, the thin optical disc 10 is not displaced due to the existence of the fitting portion in the periphery of the fitting portion in the center portion even if the fitting portion in the center portion is deformed. In this case, in order to prevent a fitting error from being generated, it is preferable to employ a mechanism of rotating the magnet chuck 24 to some degree so as to align. Further, it is further preferable that a means for detecting a failure of the fitting on the basis of a position of the magnet chuck 24 or the like is provided. In the above description, the method of chucking by means of the magnet 26 is shown, however, the other mechanism clamping method may be employed.

Further, there is considered a possibility that the displacement between the convex portion 28 on the turn table 21 and the hole of the thin optical disc 10 is generated in a state in which the thin optical disc 10 is mounted on the turn table 21. In this case, it is possible to recognize the displacement by making the convex portion 28 on the turn table 21 transparent and detecting a reflected light by means of an optical sensor or the like provided below the turn table 21. In this case, it is preferable that there is further provided with a means for correcting the position of the thin optical disc 10 by slightly rotating the turn table 21.

Figure 5A:
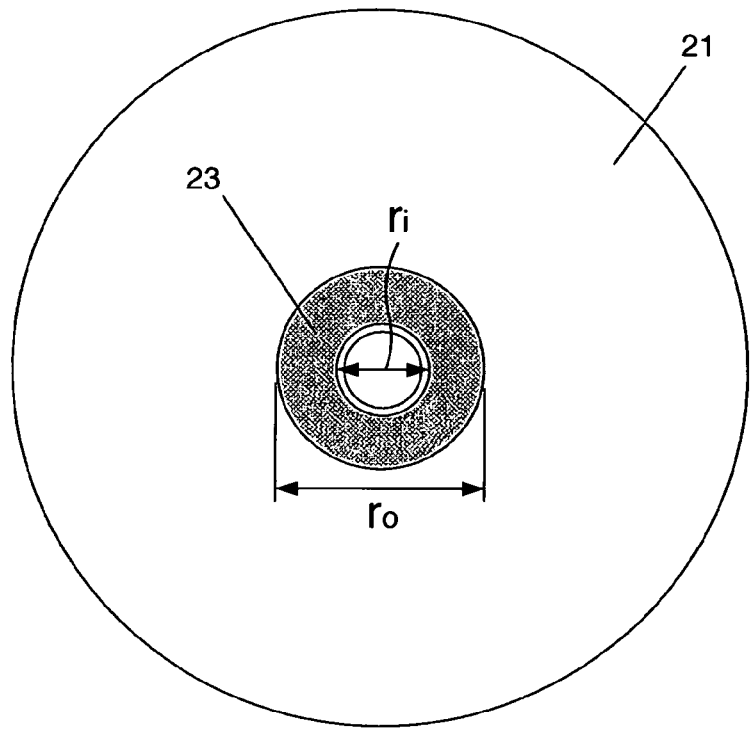
Figure 5B:
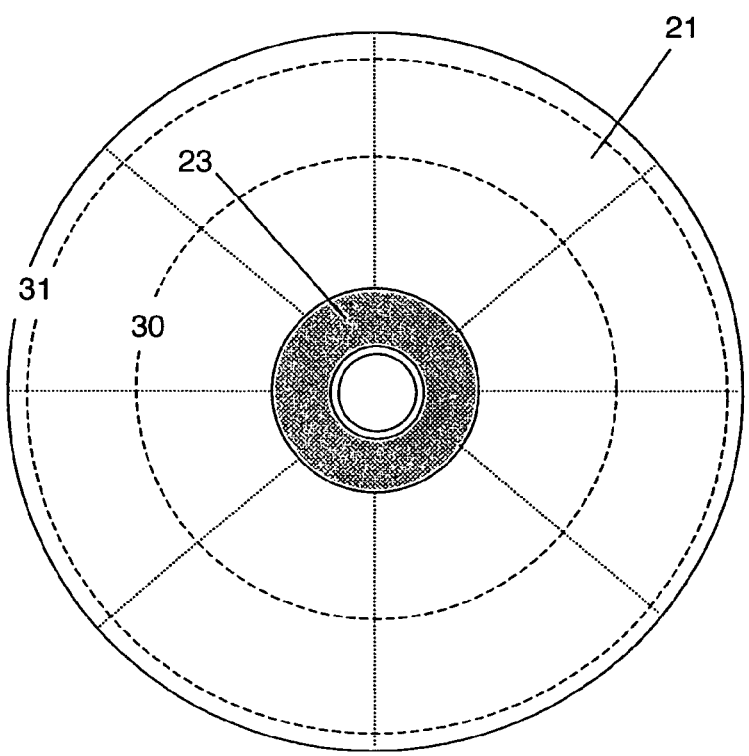
Figure 6A:
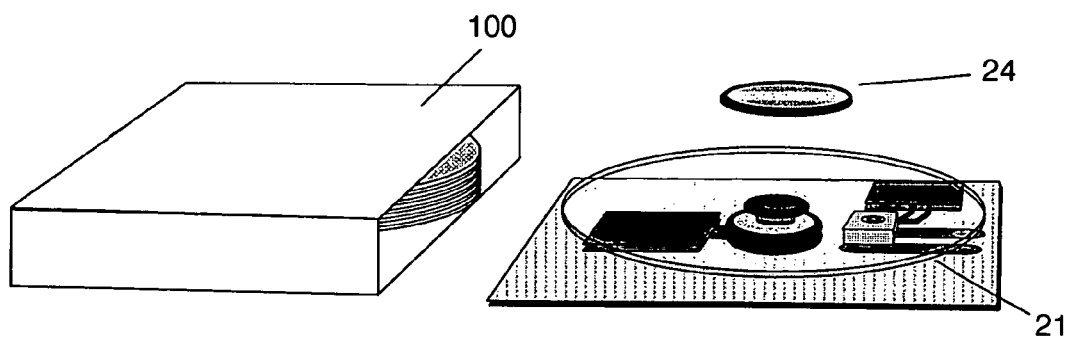
FIGS. 6A-6D are views showing an operation aspect executing a recording and reproduction by taking out the thin optical disc from the cartridge, in the recording and reproducing apparatus in accordance with the present invention.
Figure 6B:
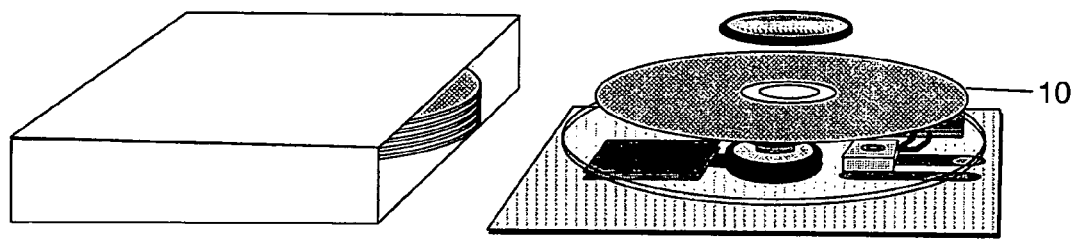
Figure 6C:
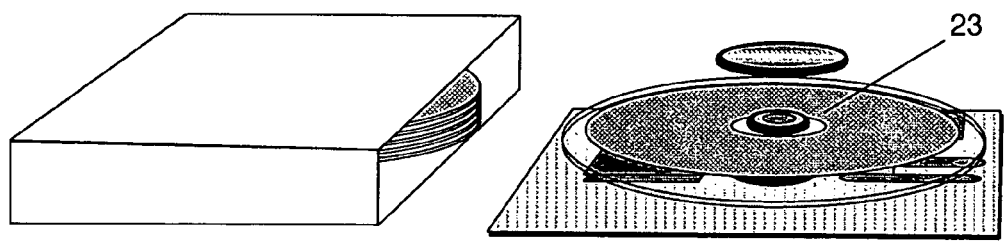
Figure 6D:
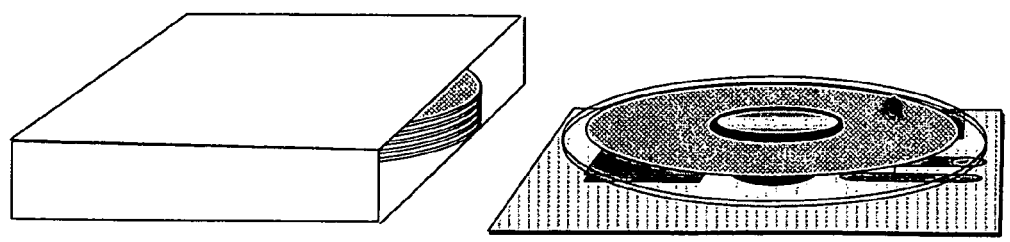

FIGS. 5A and 5B are views in detail showing a structure of the spacer 23 of the recording and reproducing apparatus shown in FIG. 3. As shown in FIG. 5A, in the spacer 23, an outer diameter ro is larger than the magnet chuck 24, an inner diameter ri is equal to or more than 15 mm, and a thickness is equal to or more than 10 micron. Accordingly, an air layer having a thickness equal to or more than 10 micron is secured between the thin optical disc 10 and the transparent turn table 21. Since the air layer executes a corresponding operation to the protection film, it is possible to effectively prevent the reflection factor fluctuation caused by the multiple reflection of the incident light to the thin optical disc 10. In the case that one spacer 23 is insufficient to prevent the deflection of the thin optical disc 10, a plurality of spacers 23 may be arranged on the turn table 21. For example, as shown in FIG. 5B, it is possible to arrange an annular additional spacer 23 along an outer periphery 31 or a middle periphery 30 (a position corresponding to a non-recorded portion of the thin optical disc 10) of the turn table 21, or a radial spacer extending from the center of the turn table 21. Particularly, an annular spacer is preferable because the annular spacer is hard to be affected by a centrifugal force at a time of always synchronously rotating the thin optical disc and the turn table at a high speed together with the recording and reproducing. Alternatively, in the case that the same concave and convex portions as those of the spacer shown in FIG. 5B are formed on the substrate surface at a time of forming the substrate of the thin optical disc 10, the same effect can be also obtained.

Manufacturing Method of Thin Optical Disc and Treating Method of Cartridge

A description will be given next of an example of a manufacturing method of the thin optical disc 10 used in the recording and reproducing apparatus in accordance with the present invention, and a treating method of the cartridge receiving the thin optical disc 10.

A desired pattern is formed as it is on a PET sheet by arranging 7×7 totally forty nine Ni stampers each formed from an original plate having a format forming an address information and a tracking groove at a track pitch of 0.74 um and a groove depth of 120 nm on the PET sheet having a thickness of 100 micron and a width of 1 meter, overheating them to 180° C. so as to press on the PET sheet by a uniform force for five second, slowly lifting up the stamper from one direction, and detaching the PET sheet from the heated stamper. At this time, a marking for making an eccentricity of the disc small is applied at the same time of the pattern transcription mentioned above. A pigment for write once is applied to an entire surface thereon, and an Al alloy reflection film is next formed in accordance with a sputtering process. Further, an ultraviolet curing resin having 15 micron is applied, and is hardened by an ultraviolet irradiation, thereby a protection coat is formed. Next, a punching step is started for forming a disc shape, however, a position of a punching machine is adjusted and fixed on the basis of the marking for making the disc eccentricity small, and an inner diameter punching and an outer diameter punching are executed. The punched disc is held in an inner peripheral side of a disc recording area by a vacuum chuck robot, and is received in the cartridge 100 shown in FIG. 2 one by one. A magnitude of the cartridge 100 is 130 mm×130 mm×30 mm, and a number of the received discs is forty.

Next, the cartridge 100 is loaded to the recording and reproducing apparatus. A leading end portion of a cassette pushes up a cassette insertion confirmation lever by the loading, and cancels a cover closing mechanism in an interlocking manner. Accordingly, a cover releasing mechanism opens the cover. In this case, if a data writing signal is input to the disc, the disc corresponding to the signal is moved onto the glass transparent substrate, and is fixed by the magnet chuck. The disc is rotated and the recording and reproducing head is moved to a lead-in region in an innermost periphery, whereby the recording is started. An operation aspect up to this is shown in FIGS. 6A to 6D. In order to replace with a new disc after the recording is finished, the coupling is cancelled by a magnet chuck attaching and detaching apparatus. The disc 10 is recovered in a waiting thin tray, and is received in the original position of the cartridge. When taking out the disc, a receive assisting mechanism having a wide frontage waits in the place to be returned, and is utilized. Next, the marker attached to a drawer portion of a thin receiving bag in which the disc to be next recorded and reproduced is received is searched by the optical detector, and is hooked by a picker so as to be pulled out. This is moved onto a glass tray, and the thin receiving bag is evacuated from the spindle so as to stand ready. The spindle is slightly moved on the basis of the signal of the positioning sensor using the protruding portion on the glass turn table 21 described in the embodiment 1, and the new thin optical disc 10 is chucked. As mentioned above, the disc is replaced. A disc replacing time is about ten second.

In this case, it is preferable that the disc information within the cartridge 100 is structured such as to be recorded in a 64 MB flash memory installed in the cartridge 100. Accordingly, since a file within the cartridge 100 can be searched without accessing the disc 10, an access time can be shortened. Further, since the disc replacing time is about ten seconds, about 125 MB data is in a process waiting state if the recording and reproducing rate is 100 Mbps. In the case of the recording, the input data may be buffered in the flash memory, a micro drive or the like. In the case of the reading, it is desirable to employ a device of discharging the data of the recovery disc in delay so as to apply no impression of a waiting time to the user.

The description is given above of the recording and reproducing apparatus of the thin optical disc in accordance with the present invention by showing the particular embodiment, however, the present invention is not limited to them. Those skilled in the art can apply various changes and modifications to the structure and the function of the present invention in accordance with the embodiment or the other embodiment within the scope of the present invention.

The invention claimed is:

1. A recording and reproducing apparatus comprising:
   a transparent turn table holding a thin optical disc; and
   an optical system including a recording and reproducing head for recording and reproducing the thin optical disc,
   wherein said optical system is arranged in an opposite side of said transparent turn table to a surface in which the thin optical disc is arranged, and a recording and reproducing light output by said optical system transmits through said transparent turn table and is focused on a recording surface of the thin optical disc,
   wherein said optical system is constituted by a DVD optical system,
   wherein a thickness of said transparent turn table and a protective film of said thin optical disc is adjusted in such a manner that an optical path length transmitting through said transparent turn table and the protective film of said thin optical disc becomes approximately equal to an optical path length of a substrate of a DVD disc in the DVD optical system.

2. A recording and reproducing apparatus as claimed in claim 1, wherein a spacer is arranged between said transparent turn table and the thin optical disc.

3. A recording and reproducing apparatus as claimed in claim 2, wherein an air layer is secured between said turn table and said thin optical disc, on the basis of said spacer.

4. A recording and reproducing apparatus as claimed in claim 1, further comprising a magnetic or mechanical means for fixing said thin optical disc on said transparent turn table.

5. A recording and reproducing apparatus as claimed in claim 2, further comprising a magnetic or mechanical means for fixing said thin optical disc on said transparent turn table.

6. A recording and reproducing apparatus as claimed in claim 3, further comprising a magnetic or mechanical means for fixing said thin optical disc on said transparent turn table.

* * * * *